United States Patent
Chang et al.

(10) Patent No.: US 10,320,969 B2
(45) Date of Patent: Jun. 11, 2019

(54) INMATE COMMUNICATION PROCESSING SYSTEM

(71) Applicant: Fedcom, Inc., Rockville, MD (US)

(72) Inventors: Sandy Y. Chang, Gaithersburg, MD (US); Mark D. Wemple, West Friendship, MD (US)

(73) Assignee: Fedcom, Inc., Rockville, MD (US)

( * ) Notice: Subject to any disclaimer, the term of this patent is extended or adjusted under 35 U.S.C. 154(b) by 0 days.

(21) Appl. No.: 15/996,398

(22) Filed: Jun. 1, 2018

(65) Prior Publication Data

US 2018/0352077 A1    Dec. 6, 2018

Related U.S. Application Data

(60) Provisional application No. 62/513,510, filed on Jun. 1, 2017.

(51) Int. Cl.
| | |
|---|---|
| *H04M 1/64* | (2006.01) |
| *H04M 3/22* | (2006.01) |
| *G06F 17/30* | (2006.01) |
| *H04M 15/04* | (2006.01) |
| *H04M 3/42* | (2006.01) |
| *G06F 16/60* | (2019.01) |
| *H04M 3/533* | (2006.01) |

(52) U.S. Cl.
CPC .......... *H04M 3/2281* (2013.01); *G06F 16/60* (2019.01); *G06F 17/3074* (2013.01); *H04M 3/2218* (2013.01); *H04M 3/42221* (2013.01); *H04M 3/53333* (2013.01); *H04M 15/04* (2013.01)

(58) Field of Classification Search
CPC . H04M 3/2281; H04M 3/42221; G06F 16/60; G06F 17/3074
See application file for complete search history.

(56) References Cited

U.S. PATENT DOCUMENTS

| | | | |
|---|---|---|---|
| 7,742,582 B2 | 6/2010 | Harper | |
| 9,106,789 B1 | 8/2015 | Shipman et al. | |
| 9,282,188 B2 * | 3/2016 | Hodge | H04M 3/533 |
| 9,311,627 B1 * | 4/2016 | Shipman, Jr. | G06Q 10/107 |
| 2014/0258825 A1 * | 9/2014 | Ghosh | G06F 17/243 |
| | | | 715/222 |
| 2016/0337360 A1 | 11/2016 | Logan | |

\* cited by examiner

*Primary Examiner* — Simon King
(74) *Attorney, Agent, or Firm* — Total Awareness Consulting Services; Robert Winslow

(57) ABSTRACT

A communication processing system is coupled to a global computer network. At least one inmate communication from an inmate is automatically converted into an inmate digital communication for communication to at least one remote device. The at least one inmate communication is received at the communication processing system from a correctional facility. At least one side of each of the at least one inmate communication is automatically scanned into at least one digital file. The at least one digital file is automatically converted into the inmate digital communication according to at least one sending template. The at least one sending template is based, at least in part, on at least one formatting requirement of at least one of: the at least one remote device, and a service provider of the at least one remote device. The inmate digital communication is electronically communicated to the at least one remote device.

16 Claims, 7 Drawing Sheets

INMATE COMMUNICATION PROCESSING SYSTEM

CROSS-REFERENCE TO RELATED APPLICATIONS

This application claims the benefit of U.S. Provisional Application No. 62/513,510, filed Jun. 1, 2017, which is hereby incorporated by reference in its entirety.

BACKGROUND

Finding inmate location information may be difficult for users of many communication systems. Correspondence sent through employment of many communication systems may be sent to an incorrect correctional facility or an incorrect address for a correctional facility. Many communication systems may not support secure processing of privileged communication. Users of many communication systems may not send privileged communication to inmates because of insecure delivery procedures. Many correctional facility employees are tasked with inefficient procedures for opening and screening correspondence sent to inmates. Many government agents and employees may experience difficulty locating and/or searching through past correspondence sent to inmates when necessary. What is needed is an improved communication conversion system.

Finding location information of friends, family members, and associates may be difficult for many inmates wishing to correspond with their friends, family members, and associates. Inmates often need to purchase postage to send or reply to mail from their friends, family members, and associates. Many correctional facility employees are tasked with inefficient procedures for sorting and screening correspondence sent from inmates. Many inmates may not send privileged communication to their associates due to insecure delivery procedures. Many government agents and employees may experience difficulty locating and searching through past correspondence sent from inmates when necessary. Correctional facilities may have to install specialized communication equipment for inmates to communicate with friends, family members, and associates. What is needed is an improved communication processing system.

DETAILED DESCRIPTION OF EMBODIMENTS

At least some embodiments of the present invention automatically convert user digital communications for inmates into printed communications for delivery to correctional facilities. At least some embodiments of the present invention automatically convert inmate communications from inmates into inmate digital communications for communication to users of remote devices.

Figure 1:
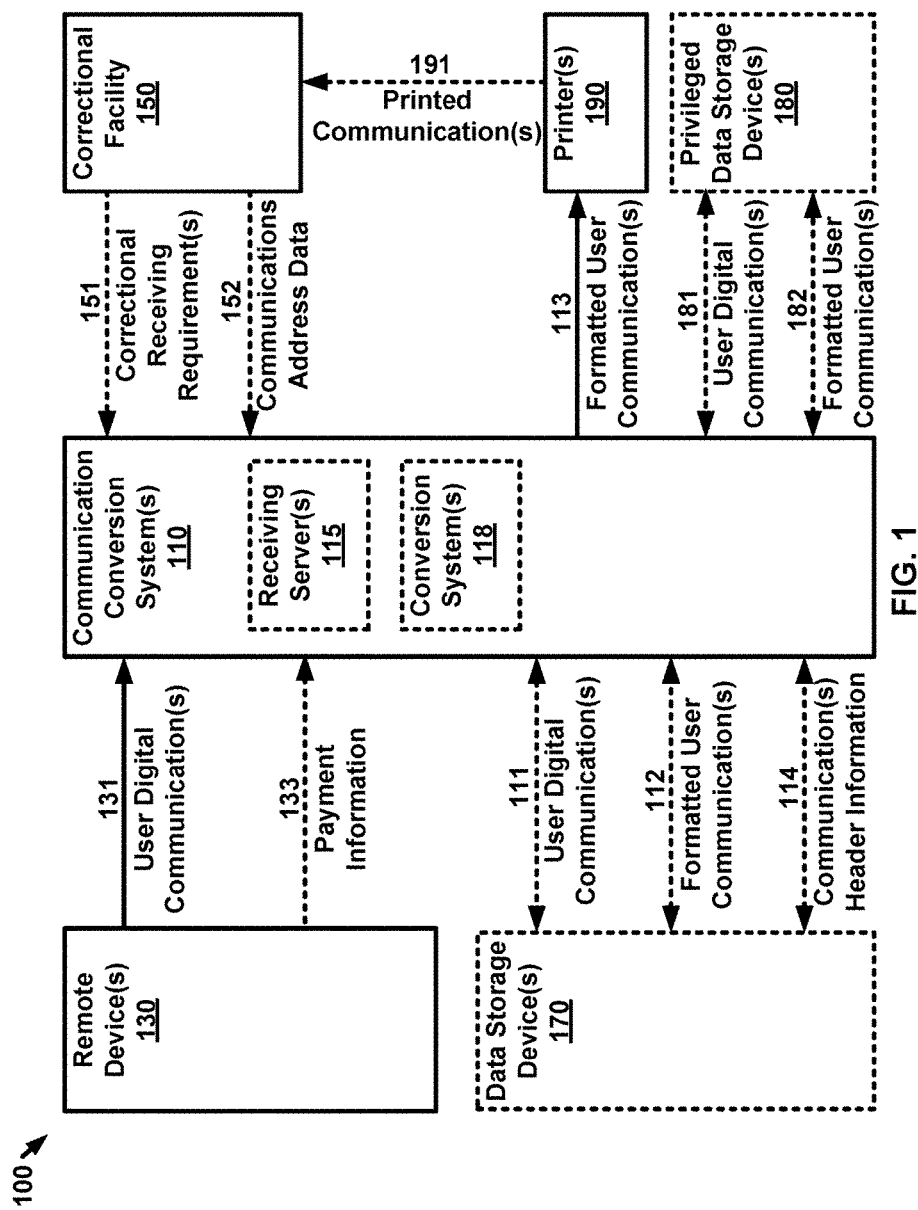
FIG. 1 is a block diagram showing an example communication conversion system network as per an aspect of various embodiments.

FIG. 1 is block diagram showing an example communication conversion system network 100 as per an aspect of various embodiments. Communication conversion system network 100 may comprise at least one communication conversion system 110, at least one remote device 130, and at least one printer 190. The at least one communication conversion system 110, at least one remote device 130, and at least one printer 190 may communicate through employment of a global computer network (e.g. the Internet). Communication through employment of the global computer network may further employ, for example, at least one application, website, digital portal, Application Programming Interface (API), electronic message, digital file, combinations thereof, and/or the like.

According to some of the various embodiments, communication conversion system 110 may be coupled to a global computer network. Communication conversion system 110 may be configured to perform a method of automatically converting user digital communication(s) 131 for an inmate into at least one printed communication 191 for delivery to correctional facility 150. User digital communication(s) 131 may originate from a user of a remote device 130. User digital communication(s) 131 may comprise at least one text message, at least one multimedia message, at least one email, at least one image, at least one audio recording, at least one voice recording, at least one video recording, combinations thereof, and/or the like. The method performed by communication conversion system 110 may comprise electronically receiving, at communication conversion system 110, user digital communication(s) 131 from remote device 130. The method performed by communication conversion system 110 may comprise automatically converting user digital communication(s) 131 into a formatted user communication(s) 113 according to at least one receiving template. The at least one receiving template may be based, at least in part, on at least one correctional receiving requirement 151. The method performed by communication conversion system 110 may comprise automatically selecting a communications address for correctional facility 150 from a plurality of communications addresses. The plurality of communications addresses may be based on communications address data 152 received from at least one correctional facility (e.g. 150). The communications address may be based, at least in part, on an identifier of the inmate supplied with user digital communication(s) 131. The method performed by communication conversion system 110 may comprise electronically communicating formatted user communication(s) 113 to printer 190 with instructions to print at least one printed communication 191. At least one printed communication 191 may be based, at least in part, on formatted user communication(s) 113. At least one printed communication 191 may be configured to be delivered to the communications address. The communications address may be one of a plurality of addresses for correctional facility 150.

According to some of the various embodiments, communication conversion system 110 may comprise multiple devices such as server(s), computer system(s), mobile device(s), combinations thereof, and/or the like. For example, communication conversion system 110 may comprise at least one receiving server 115 and at least one conversion system 118. The at least one receiving server 115 may be configured to electronically receive user digital communication(s) 131. The at least one receiving server 115 may be configured to communicate user digital communication(s) 131 to the at least one conversion system 118. The at least one conversion system 118 may be configured to automatically convert user digital communication(s) 131 into formatted user communication(s) 113.

According to some of the various embodiments, correctional facility 150 may be one of a plurality of correctional facilities. At least some of the plurality of correctional facilities may be in communication with communication conversion system 110. An inmate may be a person incarcerated at correctional facility 150. Remote device 130 may comprise multiple devices such as server(s), computer(s), mobile device(s), wearable device(s), combinations thereof, and/or the like. Examples of correctional receiving requirement(s) 151 include, for example, a maximum image size, a maximum image resolution, a maximum file size, a maximum paper size, a specific paper size, a maximum print job size, a maximum print job size per page, forbidden communication, combinations thereof, and/or the like. Correctional receiving requirement(s) 151 may, for example, be specific to a correctional facility rule, a correctional facility location, a county rule, a state rule, a federal rule, combinations thereof, and/or the like. A rule may, for example, be based on regulation(s), law(s), policy(ies), combinations thereof, and/or the like. According to some of the various embodiments, a receiving template may be based, at least in part on at least one correctional receiving requirement 151. For example, the receiving template may be configured to reformat an image size. The receiving template may, for example, be configured to convert a first resolution of an image or a video to a second resolution. The receiving template may, for example, be configured to convert at least one text message, at least one multimedia message, at least one email message, combinations thereof, and or the like into a letter. The receiving template may, for example, be configured to convert at least one audio recording into a letter. The receiving template may, for example, be configured to convert at least one voice recording into a letter. The receiving template may, for example, be configured to at least one video recording into a letter. The receiving template may, for example, be configured to remove forbidden content from user digital communication(s) 131. Forbidden content may, for example, include foul language, discussion of illicit or illegal materials or actions, nude images and/or video, combinations thereof, and/or the like. Foul language may be defined by the correctional facility and/or a government agency such as the Federal Communications Commission (FCC). The receiving template may, for example, be configured to delete user digital communication comprising forbidden content. The receiving template may be configured to remove forbidden content types from user digital communication(s) 131. Examples of forbidden content types may include, for example, images, audio recordings, voice recordings, videos, high resolution images, high resolution videos, encrypted content, handwritten text and/or drawings, combinations thereof, and/or the like.

According to some of the various embodiments, an identifier of an inmate may be supplied with user digital communication(s) 131. The identifier may, for example, comprise first name, last name, location, middle name, date of birth, social security number, inmate number or other designator, combinations thereof, and/or the like. A communications address may be based, at least in part, on the identifier. The communications address may comprise a street address. The street address may be designated for inmate communication. The communications address may comprise an electronic address. The communications address may, for example, comprise an inmate designator, pod designator, block designator, cell designator, bed designator, combinations thereof, and/or the like. Communication conversion system 110 may be configured to determine a communications address from the identifier.

According to some of the various embodiments, a method performed by communication conversion system 110 may comprise automatically applying identification information of a user of remote device 130 to user digital communication(s) 131. For example, identification information of the user may be included in account information of an account held by the user on communication conversion system 110. According to some of the various embodiments, user digital communication(s) 131 may comprise identification information for a user of remote device 130. Identification information may, for example, comprise a user name, mobile number, email address, mailing address, combinations thereof, and/or the like. User digital communication(s) 131 may comprise at least one greeting card. The at least one greeting card may, for example, comprise a digital greeting card, an image of a greeting card, an animation, a video, combinations thereof, and/or the like.

According to some of the various embodiments, at least one printed communication 191 may be void of an envelope. The at least one printed communication 191 may be void of an indication of postage. For example, the at least one printed communication 191, generated automatically through employment of communication conversion system 110, may be delivered to a communications address of correctional facility 150 by hand. In another example, the at least one printed communication 191 may be delivered electronically to at least one computer system accessible from within correctional facility 150. In yet another example, printer 190 may be disposed to correctional facility 150.

According to some of the various embodiments, a method performed by a communication conversion system 110 may comprise electronically receiving payment information 133 for at least one money order. Payment information 133 may be electronically received from remote device 130. Payment information 133 may comprise transaction information of at least one transaction processed through employment of, for example, credit card(s), debit card(s), bank account(s), electronic payment services (e.g. PayPal, bitcoin), combinations thereof, and/or the like. Payment information 133 may comprise a payment request for a transaction to be processed through employment of communication conversion system 110, at least one remote device 130, at least one merchant exchange service computer system, at least one computer system accessible from correctional facility 150, combinations thereof, and/or the like. The method performed by communication conversion system 110 may comprise automatically including the at least one money order in formatted user communication(s) 113. The at least one money order and or a designator of the at least one money order may be printed by at least one of at least one printer 190. The at least one money order and or the designator of the at least one money order may be delivered to a communications address of correctional facility 150. The at least one money order and or the designator of the at least one money order may include a statement of an account affiliated with correctional facility 150.

According to some of the various embodiments, a method performed by communication conversion system 110 may comprise automatically storing user digital communication(s) 111 and/or formatted user communication(s) 112 in at least one data storage device 170. User digital communication(s) 111 may, for example, be the same as user digital communication(s) 131. User digital communication(s) 111 may, for example, be an encrypted and/or compressed version of user digital communication(s) 131. Formatted user communication(s) 112 may, for example, be the same as formatted user communication(s) 113. Formatted user communication(s) 112 may, for example, be encrypted and/or compressed version(s) of formatted user communication(s) 113. The method performed by communication conversion system 110 may comprise automatically authenticating at least one government agency user for access to at least one data storage device 170. The method performed by communication conversion system 110 may comprise automatically granting at least one of the at least one government agency user access to at least one data storage device 170. Examples of the at least one government agency user may include law enforcement officer(s), member(s) of Department of Corrections and Rehabilitation, FBI agent(s), Homeland Security agent(s), employees of at least one correctional facility (e.g. 150), combinations thereof, and/or the like. The method performed by communication conversion system 110 may comprise automatically searching at least one data storage device 170. Searches may, for example, be based on at least one keyword, at least one identifier of at least one inmate, identification information of at least one user, combinations thereof, and/or the like. The at least one keyword may be received from the at least one government agency user. The at least one keyword may be selected by the at least one government agency user from at least one list of a plurality of keywords provided by communication conversion system 110.

According to some of the various embodiments, a method performed by communication conversion system 110 may comprise automatically identifying user digital communication(s) 131 as privileged communication(s). Identifying user digital communication(s) 131 as privileged communication(s) may be based, at least in part, on identification information of a user of remote device 130. Identifying user digital communication(s) 131 as privileged communication(s) may be based, at least in part, on a privileged communication flag associated with user digital communication(s) 131. Privileged communication(s) may comprise communication from a legal practitioner (e.g. an attorney), a medical practitioner (e.g. a doctor of physical and/or mental health), a religious practitioner (e.g. a priest or minister), combinations thereof, and/or the like. The method performed by communication conversion system 110 may comprise automatically storing communication(s) header information 114 for user digital communication(s) 131 and/or formatted user communication(s) 113 in at least one data storage device 170. Communication(s) header information 114 may comprise information other than content associated with user digital communication(s) 131 and/or formatted user communication(s) 113. The method performed by communication conversion system 110 may comprise automatically storing user digital communication(s) 181 and/or formatted user communication(s) 182 in at least one privileged data storage device 180. User digital communication(s) 181 and/or formatted user communication(s) 182 may comprise privileged communication(s). User digital communication(s) 181 may be the same as user digital communication(s) 131. Formatted user communication(s) 182 may be the same as formatted user communication(s) 113. Access to the at least one privileged data storage device 180 may be restricted. Access to the at least one privileged data storage device 180 may require a court order such as a subpoena or a warrant.

Figure 2:
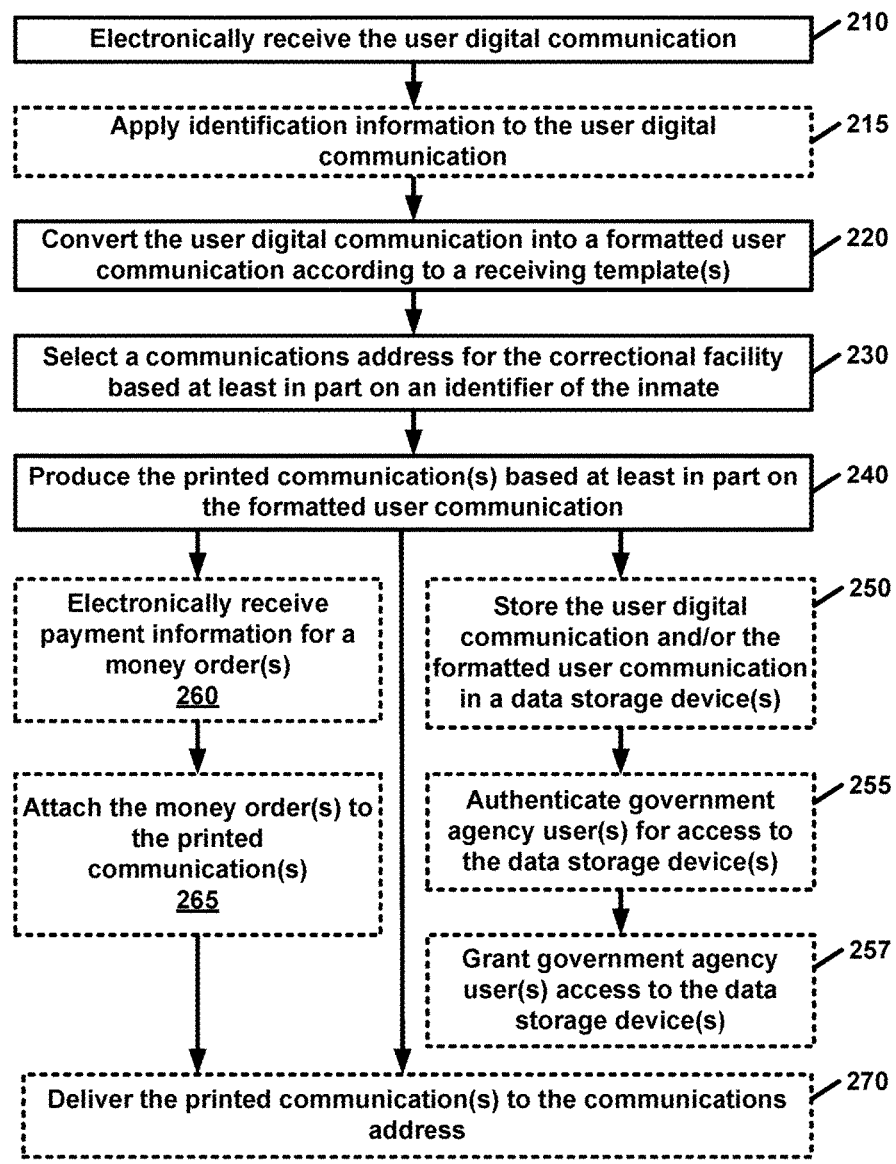
FIG. 2 is an example flow diagram of automatically converting a user digital communication as per an aspect of various embodiments.

FIG. 2 is an example flow diagram of automatically converting a user digital communication (e.g. 131) as per an aspect of various embodiments. A user digital communication (e.g. 131) may be electronically received at a communication conversion system (e.g. 110) from at least one remote device (e.g. 130) at block 210. Identification information of a user of the at least one remote device (e.g. 130) may be applied to the user digital communication (e.g. 131) at block 215. The identification information may be applied automatically. The user digital communication (e.g. 131) may be automatically converted into a formatted user communication (e.g. 113) according to at least one receiving template at block 220. The at least one receiving template may be based, at least in part, on at least one correctional receiving requirement (e.g. 151). A communications address for a correctional facility (e.g. 150) may be automatically selected from a plurality of communications addresses at block 230. The communications address may be based, at least in part, on an identifier of an inmate supplied with the user digital communication (e.g. 131). At least one printed communication (e.g. 191) may be automatically produced at block 240. The at least one printed communication (e.g. 191) may be based, at least in part, on the formatted user communication (e.g. 113). The at least one printed communication (e.g. 191) may be configured to be delivered to the communications address. The at least one printed communication (e.g. 191) may be delivered to the communications address at block 270. The at least one printed communication (e.g. 191) may be delivered automatically. Payment information (e.g. 133) for at least one money order may be electronically received at block 260. The at least one money order may be attached to the at least one printed communication (e.g. 191) at block 265. The at least one money order may be attached automatically. The user digital communication (e.g. 111) and/or the formatted user communication (e.g. 112) may be automatically stored in at least one data storage device (e.g. 170) at block 250. At least one government agency user may be authenticated for access to the at least one data storage device (e.g. 170) at block 255. The at least one government agency user may be authenticated automatically. At least one of the at least one government agency user may be granted access to the at least one data storage device (e.g. 170) at block 257. The at least one of the at least one government agency user may be granted access automatically.

Figure 3:
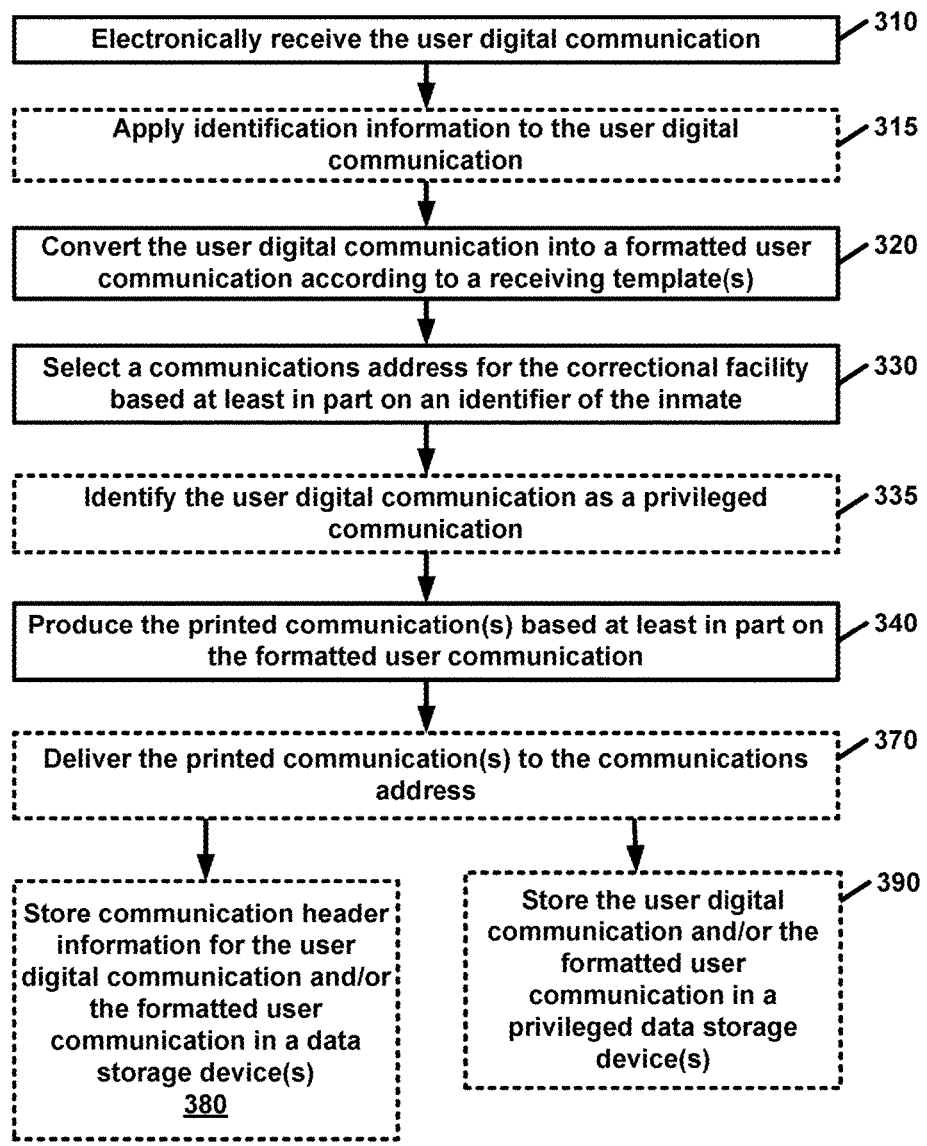
FIG. 3 is an example flow diagram of automatically converting privileged communication as per an aspect of various embodiments.

FIG. 3 is an example flow diagram of automatically converting privileged communication (e.g. 131) as per an aspect of various embodiments. A user digital communication (e.g. 131) may be electronically received at a communication conversion system (e.g. 110) from at least one remote device (e.g. 130) at block 310. Identification information of a user of the at least one remote device (e.g. 130) may be applied to the user digital communication (e.g. 131) at block 315. The user digital communication (e.g. 131) may be automatically converted into a formatted user communication (e.g. 113) according to at least one receiving template at block 320. A communications address for a correctional facility (e.g. 150) may be automatically selected from a plurality of communications addresses at block 330. The user digital communication (e.g. 131) may be identified as a privileged communication at block 335. The user digital communication (e.g. 131) may be identified as a privileged communication automatically. At least one printed communication (e.g. 191) may be automatically produced at block 340. The at least one printed communication (e.g. 191) may be delivered to the communications address at block 370. Communication header information (e.g. 114) for the user digital communication (e.g. 131) and/or the formatted user communication (e.g. 113) may be stored in at least one data storage device (e.g. 170) at block 380. The communication header information (e.g. 114) may be created and/or copied from the user digital communication (e.g. 131) and/or the formatted user communication (e.g. 113). User digital communication (e.g. 181) and/or formatted user communication (e.g. 182) may be stored in at least one privileged data storage device (e.g. 180) at block 390.

Figure 4:
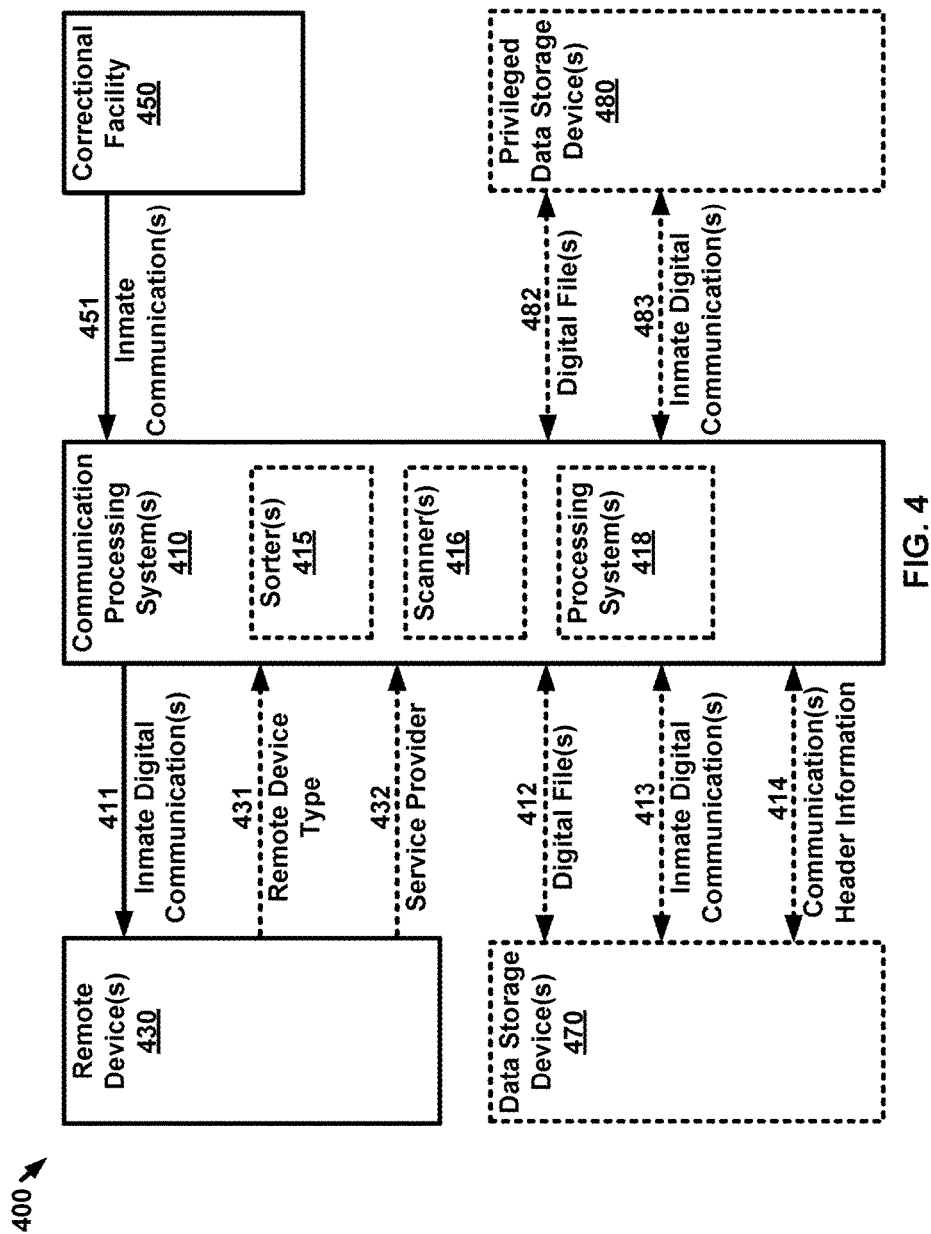
FIG. 4 is a block diagram showing an example communication processing system network as per an aspect of various embodiments.

FIG. 4 is a block diagram showing an example communication processing system network 400 as per an aspect of various embodiments. Communication processing system network 400 may comprise at least one communication processing system 410 and at least one remote device 430. At least one communication processing system 410 and at least one remote device 430 may communicate through employment of a global computer network (e.g. the Internet).

According to some of the various embodiments, communication processing system 410 may be coupled to a global computer network. Communication processing system 410 may be configured to perform a method of automatically converting at least one inmate communication 451 from an inmate, at a correctional facility 450, into inmate digital communication(s) 411 for communication to at least one remote device 430. The at least one inmate communication 451 may comprise, for example, at least one handwritten note, at least one handwritten drawing, at least one digital note, at least one image, at least one audio recording, at least one voice recording, at least one video recording, combinations thereof, and/or the like. At least one inmate communication 451 may comprise a plurality of paper sizes and/or a plurality of paper types. The method performed by communication processing system 410 may comprise receiving, at communication processing system 410, at least one inmate communication 451 from correctional facility 450. Correctional facility 450 may be one of a plurality of correctional facilities. At least some of the plurality of correctional facilities may be in communication with communication processing system 410. At least one inmate communication 451 may be received electronically. The method performed by communication processing system 410 may comprise automatically scanning, by communication processing system 410, at least one side of each of at least one inmate communication 451 into at least one digital file.

According to some of the various embodiments, a method performed by communication processing system 410 may comprise recognizing a plurality of inmate communications 451 composed by the same inmate. Recognizing the plurality of inmate communications 451 composed by the same inmate may comprise handwriting recognition and/or at least one identifier of the inmate. The identifier of the inmate may be handwritten, added by a correctional facility, encoded into a barcode, combinations thereof, and/or the like. The method performed by communication processing system 410 may comprise adding at least a portion of an identifier of the inmate to at least one inmate communication 451 received without the at least a portion of the identifier of the inmate. For example, inmate communication 451 may be received without any identifier of the inmate. In this case, the method performed by communication processing system 410 may, for example, comprise adding the first name, last name, an inmate number of the inmate, combinations thereof, and/or the like. Inmate communication 451 may, for example, be received with an inmate number. In this case, the method performed by communication processing system 410 may, for example, comprise adding the first name and last name of the inmate. Inmate communication 451 may, for example, be received with an inmate name. In this case, the method performed by communication processing system 410 may, for example, comprise adding the inmate number of the inmate. According to some of the various embodiments, the method performed by communication processing system 410 may comprise adding a barcode comprising an identifier of the inmate to at least one inmate communication 451. The method performed by communication processing system 410 may comprise adding a date stamp to at least one inmate communication 451. The date stamp may be based on a receiving and/or scanning event.

According to some of the various embodiments, a method performed by communication processing system 410 may comprise combining a plurality of digital files into one digital file. The method performed by communication processing system 410 may comprise automatically converting at least one digital file into inmate digital communication(s) 411 according to at least one sending template. The at least one sending template may be based, at least in part, on at least one formatting requirement of at least one remote device 430 and/or a service provider of at least one remote device 430. For example, the at least one formatting requirement of at least one remote device 430 may be based on remote device type 431. The at least one sending template may, for example, be configured to flag names and/or locations. Names and/or locations may be specified by at least one correctional facility (e.g. 450). According to some of the various embodiments, remote device type 431 may be employed to determine a screen size and/or screen resolution of at least one remote device 430. The at least one formatting requirement of the service provider of at least one remote device 430 may be based on service provider information 432. Service provider information 432 may be employed to determine a communications requirement such as, for example, size, format, content types, combinations thereof, and/or the like. The method performed by communication processing system 410 may comprise electronically communicating inmate digital communication(s) 411 to at least one remote device 430.

According to some of the various embodiments, communication processing system 410 may comprise multiple devices such as sorter(s), scanner(s), server(s), computer systems(s), mobile device(s), combinations thereof, and/or the like. For example, communication processing system 410 may comprise at least one sorter 415, at least one scanner 416, and at least one processing system 418. The at least one sorter 415 may be configured to receive at least one inmate communication 451. The at least one sorter 415 may be configured to prepare at least one inmate communication 451 for scanning. The at least one scanner 416 may be configured to scan at least one inmate communication 451 into at least one digital file. The at least one scanner 416 may be configured to communicate the at least one digital file to the at least one processing system 418. The at least one processing system 418 may be configured to automatically convert the at least one digital file into inmate digital communication(s) 411. The at least one sorter 415 and the at least one scanner 416 may be the same device.

According to some of the various embodiments, at least one inmate communication 451 may comprise an identifier of the inmate. The identifier may, for example, comprise a first name, a last name, a location, a middle name, a date of birth, a social security number, an inmate number or other designator, combinations thereof, and/or the like. At least one inmate communication 451 may comprise identification information of a user of at least one remote device 430. Electronic communication with at least one remote device 430 may be based, at least in part, on the identification information of the user. For example, communication processing system 410 may be configured to determine an electronic address (e.g. email address, mobile phone number, social media account) of a user of at least one remote device 430 from at least a part of identification information (e.g. user name, first name, last name, city, mailing address) of the user. In another example, communication processing system 410 may be configured to prepare at least one digital file for direct mail if the intended recipient is not a registered user of communication processing system 410. According to some of the various embodiments, at least one inmate communication 451 may be void of an envelope. At least one inmate communication 451 may be void of an indication of postage.

According to some of the various embodiments, a method performed by communication processing system 410 may comprise automatically storing at least one digital file 412 and/or at least one inmate digital communication 413 in at least one data storage device 470. At least one inmate digital communication(s) 413 may be the same as at least one inmate digital communication 411. At least one inmate digital communication(s) 413 may be an encrypted and/or compressed version of at least one inmate digital communication 411. The method performed by communication processing system 410 may comprise automatically authenticating at least one government agency user for access to at least one data storage device 470. The method performed by communication processing system 410 may comprise automatically granting at least one of the at least one government agency user access to at least one data storage device 470. The method performed by communication processing system 410 may comprise facilitating a compliance verification. The compliance verification may be requested by at least one government agency user. The compliance verification may be based, at least in part, on privileged communication (e.g. 482 and 483) and/or communication(s) header information 414. The method performed by communication processing system 410 may comprise automatically searching at least one data storage device 470. Searches may, for example, be based on at least one keyword, at least one identifier of at least one inmate, identification information of at least one user, combinations thereof, and/or the like. The at least one keyword may be received from the at least one government agency user. The at least one keyword may be selected by the at least one government agency user from at least one list of a plurality of keywords provided by communication conversion system 410.

According to some of the various embodiments, a method performed by communication processing system 410 may comprise automatically identifying inmate digital communication 451 as a privileged communication. Identifying inmate digital communication 451 as a privileged communication may be based, at least in part, on identification information of a user of remote device 430. Identifying inmate digital communication 451 as a privileged communication may be based, at least in part, on a privileged communication designator associated with inmate digital communication 451. The privileged communication designator may be based, at least in part, on an intended recipient of inmate digital communication 451. The privileged communication designator may be based, at least in part, on identification information of a user of remote device 430. For example, the intended recipient and/or identification information may comprise a legal practitioner, a medical practitioner, a religious practitioner, combinations thereof, and/or the like. According to some of the various embodiments, the method performed by communication processing system 410 may comprise automatically storing communication header information 414 for the at least one digital file 412 and/or inmate digital communication 413 in at least one data storage device 470. Communication header information 414 may comprise information other than content associated with the at least one digital file 412 and/or inmate digital communication 413. The method performed by communication processing system 410 may comprise automatically storing at least one digital file 482 and/or at least one inmate digital communication 483 in at least one privileged data storage device 480. The at least one digital file 482 and/or the at least one inmate digital communication 483 may comprise a privileged communication. The at least one inmate digital communication 483 may be the same as at least one inmate digital communication 411. Access to the at least one privileged data storage device 480 may be restricted. Access to the at least one privileged data storage device 480 may require a court order such as a subpoena or a warrant.

According to some of the various embodiments, an inmate communication system may comprise at least one communication conversion system 110, at least one data storage device (170 and/or 470), at least one printer 190, at least one communication processing system 410, combinations thereof, and/or the like. The at least one communication conversion system 110 may increase efficiency for users, correctional facility employees, government agents and employees, combinations thereof, and/or the like. Efficiencies include improving accuracy and speed when finding inmate location information, sending correspondence to at least one correctional facility, opening and screening correspondence sent to inmates, locating and/or searching through past correspondence sent to inmates combinations thereof, and/or the like. The at least one communication processing system 410 may increase efficiency for inmates, users, correctional facility employees, government agents and employees, combinations thereof, and/or the like. Efficiencies include improving accuracy and speed when finding location information of friends and family members of inmates, sending or replying to mail from friends and family members of inmates, sorting and screening correspondence sent from inmates, locating and searching through past correspondence sent from inmates, combinations thereof, and/or the like.

Figure 5:
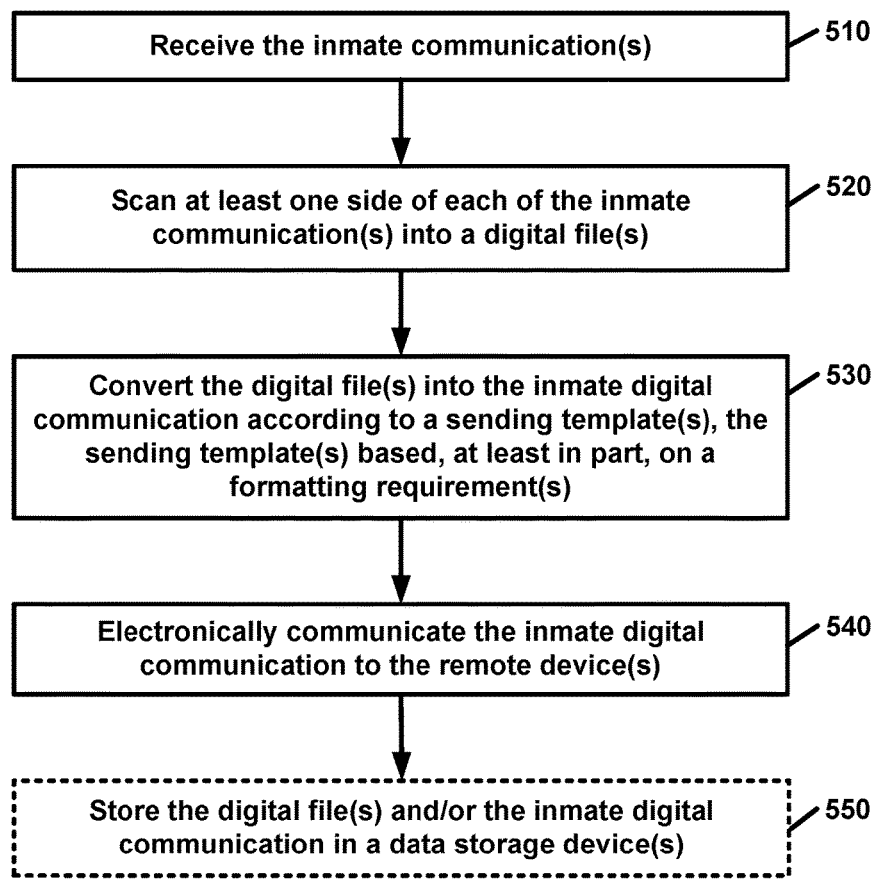
FIG. 5 is an example flow diagram of automatically converting at least one inmate communication as per an aspect of various embodiments.

FIG. 5 is an example flow diagram of automatically converting at least one inmate communication (e.g. 451) as per an aspect of various embodiments. At least one inmate communication (e.g. 451) may be received at a communication processing system (e.g. 410) from a correctional facility (e.g. 450) at block 510. The at least one inmate communication (e.g. 451) may originate from an inmate. At least one side of each of the at least one inmate communication (e.g. 451) may be automatically scanned by the communication processing system (e.g. 410) at block 520. The at least one side of each of the at least one inmate communication (e.g. 451) may be automatically scanned into at least one digital file. The at least one digital file may be automatically converted into an inmate digital communication (e.g. 411) at block 530. The at least one digital file may be automatically converted according to at least one sending template. The at least one sending template may be based, at least in part, on at least one formatting requirement of at least one remote device (e.g. 430) and/or a service provider of the at least one remote device (e.g. 430). The inmate digital communication (e.g. 411) may be electronically communicated to the at least one remote device (e.g. 430) at block 540. The at least one digital file (e.g. 412) and/or the inmate digital communication (e.g. 413) may be stored in at least one data storage device (e.g. 470) at block 550.

Figure 6:
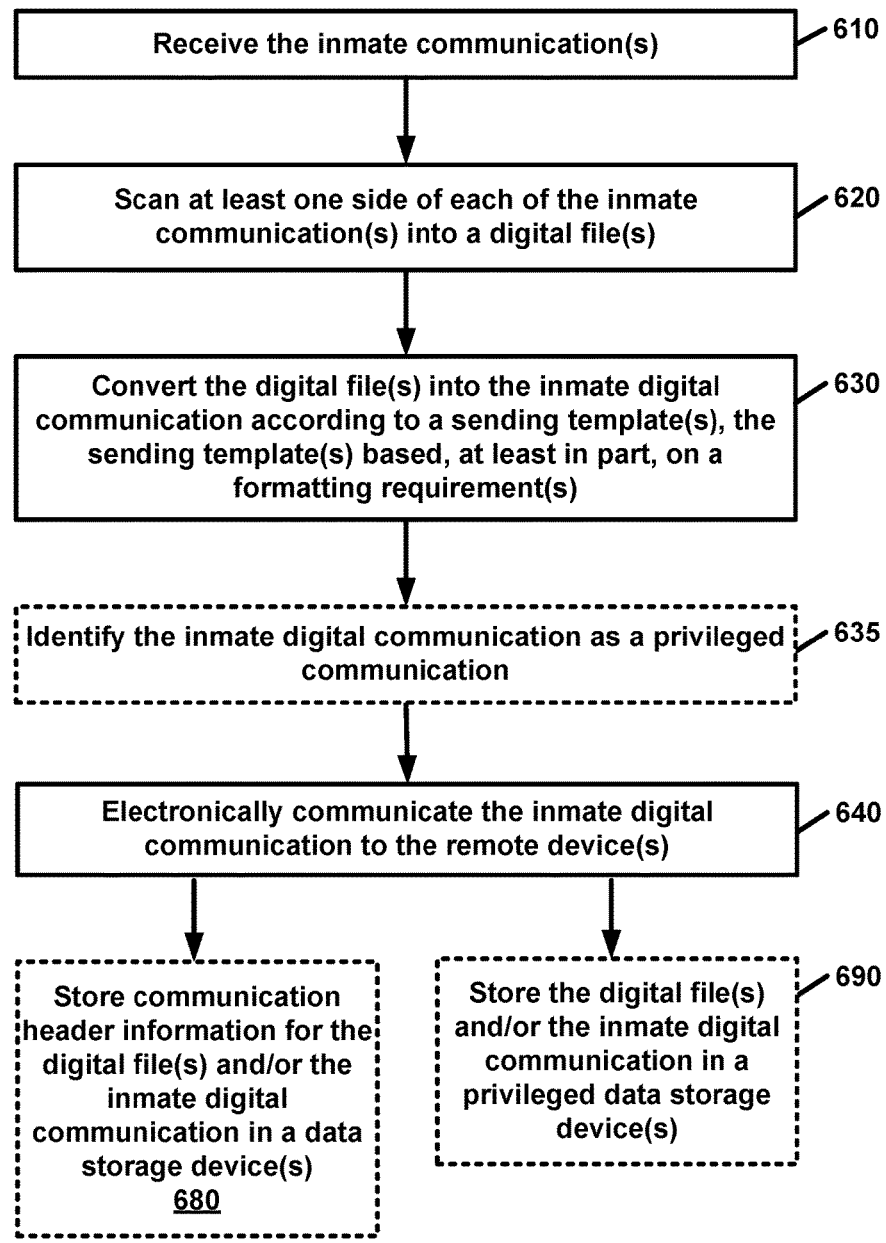
FIG. 6 is an example flow diagram of automatically converting at least one privileged communication as per an aspect of various embodiments.

FIG. 6 is an example flow diagram of automatically converting at least one privileged communication (e.g. 451) as per an aspect of various embodiments. At least one inmate communication (e.g. 451) may be received at a communication processing system (e.g. 410) from a correctional facility (e.g. 450) at block 610. At least one side of each of the at least one inmate communication (e.g. 451) may be automatically scanned by the communication processing system (e.g. 410) at block 620. The at least one side of each of the at least one inmate communication (e.g. 451) may be automatically scanned into at least one digital file. The at least one digital file may be automatically converted into an inmate digital communication (e.g. 411) at block 630. The at least one digital file may be automatically converted according to at least one sending template. The at least one sending template may be based, at least in part, on at least one formatting requirement of at least one remote device (e.g. 430) and/or a service provider of the at least one remote device (e.g. 430). The at least one inmate communication (e.g. 451) may be identified as a privileged communication at block 635. The at least one inmate communication (e.g. 451) may be identified as a privileged communication automatically. The inmate digital communication (e.g. 411) may be electronically communicated to the at least one remote device (e.g. 430) at block 640. Communication header information (e.g. 414) for the at least one digital file (e.g. 412) and/or inmate digital communication (e.g. 413) may be stored in at least one data storage device (e.g. 470) at block 680. The communication header information (e.g. 414) may be created and/or copied from the at least one digital file (e.g. 412) and/or the inmate digital communication (e.g. 413). At least one digital file (e.g. 482) and/or inmate digital communication (e.g. 483) may be stored in at least one privileged data storage device (e.g. 480) at block 690.

Figure 7:
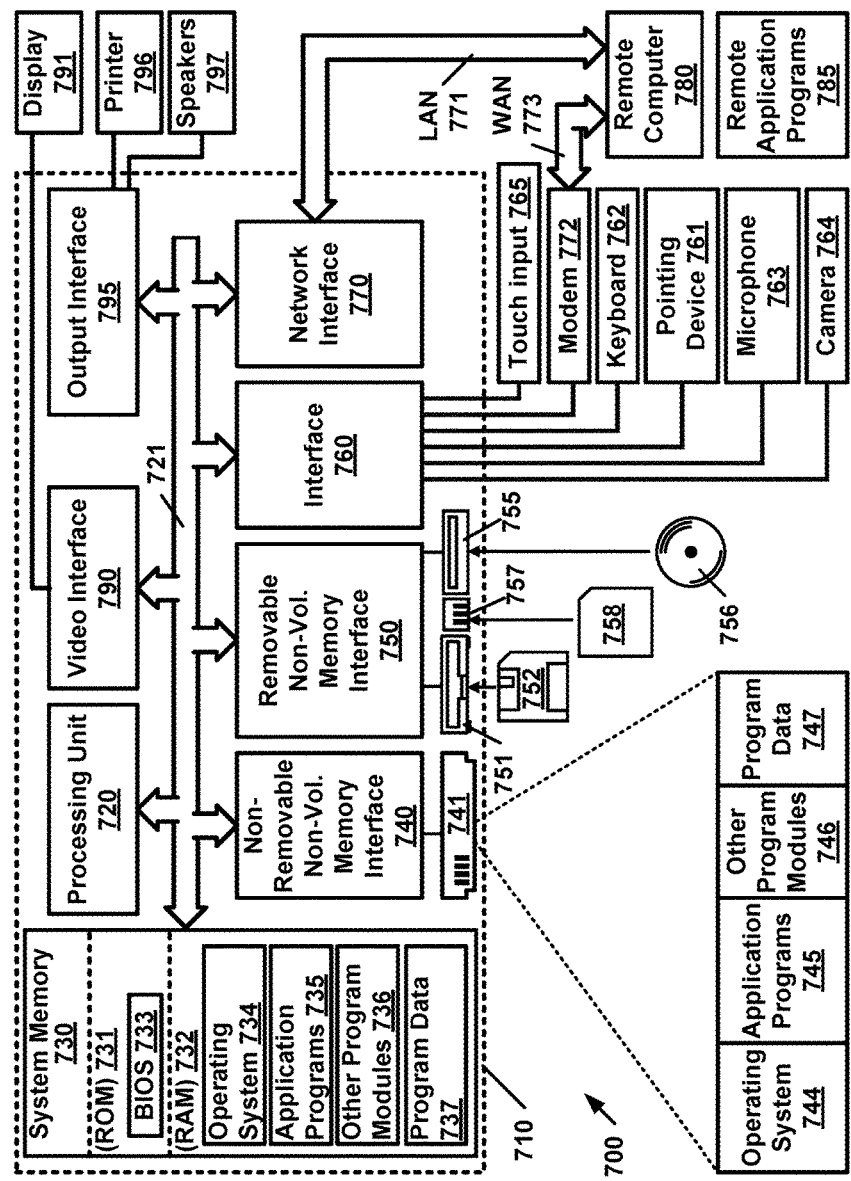
FIG. 7 is a block diagram of an example computing environment in which aspects of embodiments of the present invention may be practiced.

FIG. 7 is a block diagram of an example computing environment 700 in which aspects of embodiments of the present invention may be practiced. The computing environment may comprise computing device 710. Components of computing device 710 may include, but are not limited to, a processing unit 720, a system memory 730, and a system bus 721 that couples various system components including the system memory 730 to the processing unit 720.

Computing device 710 may comprise a variety of computer readable media. Computer readable media may be available media accessible by computing device 710 and may include both volatile and nonvolatile media, removable and non-removable media. By way of example, and not limitation, computer readable media may comprise computer storage media and communication media. Computer storage media may comprise both volatile and nonvolatile, removable and non-removable media implemented in a method or technology for storage of information such as computer readable instructions, data structures, program modules, other data, combinations thereof, and/or the like. Computer storage media may comprise, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, and/or any other medium which may be employed to store information and which may be accessed by computer 710. Communication media may comprise computer readable instructions, data structures, program modules and/or other data in a modulated data signal such as a carrier wave and/or other transport mechanism and may comprise information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above may also be included within the scope of computer readable media.

The system memory 730 may comprise computer storage media in the form of volatile and/or nonvolatile memory such as ROM 731 and RAM 732. A basic input/output system 733 (BIOS), containing the basic routines that help to transfer information between elements within computer 710, such as during start-up, may be stored in ROM 731. RAM 732 may comprise data and/or program modules that may be accessible to and/or presently being operated on by processing unit 720. By way of example, and not limitation, FIG. 7 illustrates operating system 734, application programs 735, other program modules 736, and program data 737.

The computing device 710 may also comprise other removable/non-removable volatile/nonvolatile computer storage media. By way of example only, FIG. 7 illustrates a hard disk drive 741 that may read from or write to non-removable, nonvolatile magnetic media, a magnetic disk drive 751 that may read from or write to a removable, nonvolatile magnetic disk 752, a flash drive reader 757 that may read flash drive 758, and an optical disk drive 755 that may read from or write to a removable, nonvolatile optical disk 756 such as a CD ROM or other optical media. Other removable/non-removable, volatile/nonvolatile computer storage media that may be used in the operating environment include, but are not limited to, magnetic tape cassettes, flash memory cards, digital versatile disks, digital video tape, solid state RAM, solid state ROM, and the like. The hard disk drive 741 may be connected to the system bus 721 through a non-removable memory interface such as interface 740, and magnetic disk drive 751 and optical disk drive 755 may be connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, program data 747, and other program modules 746. Additionally, for example, non-volatile memory may include instructions for presenting images on a display 791 of computing device 700 and/or the like. Similarly, non-volatile memory may comprise instructions for causing the presentation of images on the display of a remote computing device 780 and/or the like. Display 791 and touch input 765 may be integrated into the same device.

A user may enter commands and information into computing device 710 through input devices such as a touch input device 765, a keyboard 762, a microphone 763, a camera 764, and a pointing device 761, such as a mouse, trackball or touch pad. These and other input devices may be connected to the processing unit 720 through interface 760 coupled to system bus 721, but may be connected by other interface and bus structures, such as a parallel port, game port or a universal serial bus (USB). A display 791 or other type of display device may be connected to the system bus 721 via an interface, such as a video interface 790. Other devices, such as, for example, speakers 797 and printer 796 may be connected to the system via output interface 795.

The computing device 710 may be operated in a networked environment using logical connections to one or more remote computers, such as a remote computer 780. Remote computer 780 may be a personal computer, a hand-held device, a server, a router, a network PC, a peer device or other common network node, and typically includes many or all of the elements described above relative to the computing device 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computing device 710 is connected to the LAN 771 through a network interface or adapter 770. When used in a WAN networking environment, the computing device 710 may comprise a modem 772 or other means for establishing communications over the WAN 773, such as the Internet. The modem 772, which may be internal or external, may be connected to the system bus 781 via interface 760, or other appropriate mechanism. The modem 772 may be wired or wireless. Examples of wireless devices may comprise, but are not limited to: Wi-Fi and Bluetooth. In a networked environment, program modules depicted relative to the computing device 710, or portions thereof, may be stored in the remote memory storage device. By way of example, and not limitation, FIG. 7 illustrates remote application programs 785 as residing on remote computer 780. It will be appreciated that the network connections shown are presented as examples only and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, communication conversion system 110 may comprise a server and remote device 130 may comprise a mobile device. However, one skilled in the art will recognize that the server and mobile device may vary from a traditional server/device relationship over a network such as the internet. For example, a server may be collective based: portable equipment, broadcast equipment, virtual, application(s) distributed over a broad combination of computing sources, part of a cloud, and/or the like. Similarly, for example, a mobile device may be a user based client, portable equipment, broadcast equipment, virtual, application(s) distributed over a broad combination of computing sources, part of a cloud, and/or the like. Similarly, for example purposes, communication processing system 410 may comprise a server and remote device 430 may comprise a mobile device.

In this specification, various embodiments are disclosed. Limitations, features, and/or elements from the disclosed example embodiments may be combined to create further embodiments within the scope of the disclosure.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A communication processing system coupled to a global computer network and configured to perform a method of automatically converting at least one inmate communication from an inmate into an inmate digital communication for communication to at least one remote device, the method performed by the communication processing system comprising:
    a) receiving, at the communication processing system, the at least one inmate communication from a correctional facility;
    b) automatically scanning, by the communication processing system, at least one side of each of the at least one inmate communication into at least one digital file;
    c) automatically converting the at least one digital file into the inmate digital communication according to at least one sending template, the at least one sending template based, at least in part, on at least one formatting requirement of at least one of:
        i) the at least one remote device; and
        ii) a service provider of the at least one remote device; and
    d) electronically communicating the inmate digital communication to the at least one remote device.

2. The system according to claim 1, wherein at least one of the at least one inmate communication comprises an identifier of the inmate.

3. The system according to claim 1, wherein at least one of the at least one inmate communication comprises identification information of a user of the at least one remote device.

4. The system according to claim 1, wherein the at least one inmate communication is void of an envelope.

5. The system according to claim 1, wherein the at least one inmate communication is void of an indication of postage.

6. The system according to claim 1, wherein the method performed by the communication processing system further comprises automatically storing at least one of the following in at least one data storage device:
    a) the at least one digital file; and
    b) the inmate digital communication.

7. The system according to claim 1, wherein the method performed by the communication processing system further comprises:
    a) automatically identifying the inmate digital communication as a privileged communication; and
    b) automatically storing communication header information for at least one of the following in at least one data storage device:
        i) the at least one digital file; and
        ii) the inmate digital communication.

8. The system according to claim 1, wherein the method performed by the communication processing system further comprises:
    a) automatically identifying the inmate digital communication as a privileged communication; and
    b) automatically storing at least one of the following in at least one privileged data storage device:
        i) the at least one digital file; and
        ii) the inmate digital communication.

9. A method of automatically converting at least one inmate communication from an inmate into an inmate digital communication for communication to a user of at least one remote device, the method comprising:
    a) receiving, at a communication processing system, the at least one inmate communication from a correctional facility;
    b) automatically scanning, by the communication processing system, at least one side of each of the at least one inmate communication into at least one digital file;
    c) automatically converting the at least one digital file into the inmate digital communication according to at least one sending template, the at least one sending template based, at least in part, on at least one formatting requirement of at least one of:
        i) the at least one remote device; and
        ii) a service provider of the at least one remote device; and
    d) electronically communicating the inmate digital communication to the at least one remote device.

10. The method according to claim 9, wherein at least one of the at least one inmate communication comprises an identifier of the inmate.

11. The method according to claim 9, wherein at least one of the at least one inmate communication comprises identification information of the user of the at least one remote device.

12. The method according to claim 9, wherein the at least one inmate communication is void of an envelope.

13. The method according to claim 9, wherein the at least one inmate communication is void of an indication of postage.

14. The method according to claim 9, further comprising storing at least one of the following in at least one data storage device:
    a) the at least one digital file; and
    b) the inmate digital communication.

15. The method according to claim 9, further comprising:
    a) identifying the inmate digital communication as a privileged communication; and
    b) storing communication header information for at least one of the following in at least one data storage device:
        i) the at least one digital file; and
        ii) the inmate digital communication.

16. The method according to claim 9, further comprising:
    a) identifying the inmate digital communication as a privileged communication; and b) storing at least one of the following in at least one privileged data storage device:
   i) the at least one digital file; and
   ii) the inmate digital communication.

\* \* \* \* \*